Patented Nov. 27, 1923.

1,475,762

UNITED STATES PATENT OFFICE.

EDWARD L. FORD, OF YOUNGSTOWN, OHIO.

METHOD OF PUDDLING.

No Drawing. Application filed January 31, 1921. Serial No. 441,507.

*To all whom it may concern:*

Be it known that I, EDWARD L. FORD, a citizen of the United States, residing at Youngstown, in the county of Mahoning and State of Ohio, have invented a new and useful Improvement in Methods of Puddling, of which the following is a full, clear, and exact description.

My invention relates to the manufacture of wrought iron by what is known as the "puddling" process.

The object of my invention is to reduce the time of making a heat, to reduce or remove red shortness in the product and to better the product of mechanical puddlers.

Heretofore, in the ordinary puddling of iron, there were three well recognized stages in the operation following the melting of the pig iron. These were:—first, the period of removing the silicon and the larger part of the phosphorus. Second, the removal of carbon (the boiling stage), and third, the balling of the decarburized iron. The metalloids are removed by oxide of iron, (usually in the form of cinder or scale) this combining with the cilicon and phosphorus to form silicates and phosphates; and its oxygen content combines with the carbon to form carbon monoxide which causes the boiling and bubbling of the bath.

In these old processes the boiling period is necessarily a long and laborious one, the operator rabbling the metal to mix it with the slag and scale and thoroughly work it before balling. The pig iron used was one fairly high in phosphorus in order to prevent the resulting muck bar from being red short. This red shortness is still more pronounced in mechanically puddled iron and unless a fairly high phosphorus pig is used, a seriously defective product is formed.

I have discovered that red shortness in such products is increased by an increased temperature of the bath during the second stage and correspondingly is reduced by lowering the temperature during this carbon removal stage.

I have also found that if, at about the end of the first stage, the metal is cooled down below the melting point, preferably by adding oxide of iron, the contents of the furnace become granular, there is no boiling and yet the carbon is removed more rapidly than in the old boiling step. I have further found that in such case the resulting iron is not red short, even with a low phosphorus content in the pig iron used.

In carrying out my process, therefore, before the end of the period of removing silicon and phosphorus, the heat is turned off the furnace and sufficient oxide of iron, preferably FeO, either cold or preheated, is added to the furnace contents to cool them down below the melting point and granulate the iron. Volumes of carbon monoxide are at once given off, and this in meeting the air burns to carbon dioxide which pours out of the furnace openings in sheets with its characteristic whitish blue flame. When the flames die down, the furnace heat is turned on and the temperature raised as rapidly as possible to a welding heat. The particles of the metal than agglomerate and are balled up either by hand, or by operating the furnace if a mechanical puddling furnace is employed.

In order to carry out the first steps of silicon and phosphorus removal rapidly and effectively, the melted pig iron should be fed into the puddling furnace at a temperature high enough to combine rapidly with the oxide of iron present for oxidizing these metalloids. Hence, I prefer to interpose between the cupolas, blast furnaces, or other primary melters, an intermediate furnace or mixer provided with heating means to regulate and control the heat of the melted pig iron so that it will be at a proper high temperature to react promptly with the oxides present in the puddling furnace. This temperature, however, should be controlled, since, if it is too high, the reaction may be so violent that part of the charge will be thrown out of the furnace, while, on the other hand, if it is lower than necessary, the reactions will take place so slowly that much valuable time is lost. In other words, the temperature of the molten pig iron should be raised to such a point that the reactions with the oxides will take place rapidly but the charge will not be thrown out of the furnace. This temperature will differ somewhat with different conditions, kinds of pig iron, etc. We have found that when my process is used in the well known rotary puddling furnace, the heats may be made in from ten to fifteen minutes with a good product free from red shortness.

The essential feature of my process lies in the cooling down and granulating of the metal bath following the removal of the silicon and at least the larger part of the phosphorus, this point being indicated by the bubbling of the bath. Thus the boiling stage of carbon removal is substantially done away with, the carbon being removed from the iron while in a semi-solid or granular condition.

The advantages of my process are marked and distinct. They lie mainly in the short time occupied in the heat, the large output and the preventing of red shortness in the product without regard to the phosphorus contents of the pig iron. The process is especially advantageous in mechanical puddling.

I believe that the liability to red shortness is removed because the metal is granulated before it has a proper opportunity to dissolve iron oxide or oxygen; for the carbon is removed while it is in this granular condition. However, irrespective of theory, I have demonstrated again and again that the difficulty of red shortness is removed and the time of the process is greatly reduced.

The operation may be carried out in many different types of apparatus and many other changes may be made without departing from my invention, since I consider myself to be the first to substantially eliminate the boiling period in making puddled iron and the first to cool down and granulate the iron before the end of the period of removing silicon and phosphorus.

I claim:

1. In the making of puddled iron, the steps consisting of cooling down the puddle bath by adding iron oxides near the end of the period of removing silicon and phosphorus and removing carbon from the iron while in a grained or granulated condition.

2. In the making of puddled iron, the steps consisting of cooling down the puddle bath and granulating the metal by adding an oxide at or before the beginning of the boiling period, and removing the carbon from the iron while in granular form.

3. In the making of puddled iron, the steps consisting of adding oxide of iron to a puddle bath at or near the beginning of the boiling period in sufficient amount to cool down the bath to the point where the iron granulates, allowing the carbon to be removed from the iron in the form of a gas, and balling the metal.

4. In the making of puddled iron, the steps consisting of introducing molten pig iron into a puddling furnace with an oxide and at a regulated temperature sufficient to give rapid removal of some of the metalloids, and then cooling down the charge at or before the beginning of the boiling period by adding sufficient oxides to stop boiling and convert the iron into a granular or semi-liquid condition.

5. In the making of puddled iron, the steps consisting of holding a volume of molten pig iron, bringing it to a proper temperature to properly react with oxides, then charging it into a puddling furnace, substantially removing the silicon and phosphorus and then adding sufficient oxides to cool the charge down and immediately granulate the same.

6. In the making of puddled iron, the step consisting of adding to the molten pig iron bath at a time preceding the boiling period, sufficient oxide to cool down the bath to a point where the metal grains or granulates.

7. In the making of puddled iron, the steps consisting of lowering the temperature of the bath and also effecting a reduction of the boiling near the end of the period of removing silicon and phosphorus sufficiently to cause the iron to granulate, and removing carbon from the iron while the same is in said granular condition.

8. In the making of puddled iron, the steps consisting of cooling down the puddle bath below the melting point of the iron at or before the beginning of the boiling period, and removing carbon from the iron while the same is in said cooled condition.

9. In the making of puddled iron, the steps consisting of cooling down the puddle bath below the melting point of the iron at or before the beginning of the boiling period, removing carbon from the iron while the same is in said cooled condition, and balling the metal.

In testimony whereof I have hereunto set my hand.

EDWARD L. FORD.